United States Patent [19]
Jaster et al.

[11] 3,745,447
[45] July 10, 1973

[54] CONTACTLESS TEST APPARATUS FOR DETERMINING THE SENSITIVITY OF REED SWITCHES

[75] Inventors: Dale R. Jaster, Northlake; James R. Quigley, Lombard, both of Ill.

[73] Assignee: GTE Automatic Electric Laboratories Incorporated, Northlake, Ill.

[22] Filed: July 3, 1972

[21] Appl. No.: 268,368

[52] U.S. Cl............................................. 324/28 RS
[51] Int. Cl............................................ G01r 31/02
[58] Field of Search...................... 324/28 R, 28 RS, 324/34 RS; 29/593, 622; 335/151–154

[56] References Cited
UNITED STATES PATENTS
3,609,524   9/1971   Kazmer.......................... 324/38 RS Primary Examiner—Robert J. Corcoran
Attorney—K. Mullerheim, Robert F. Van Epps et al.

[57] ABSTRACT

There is herein disclosed a reed switch test apparatus wherein reed switches are fed longitudinally through a linear array of test coils having selected flux densities. Operation and release of the reed switch contacts is electromagnetically sensed and output signals are produced to segregate reed switches into high, low and nominal sensitivity categories.

13 Claims, 4 Drawing Figures

CONTACTLESS TEST APPARATUS FOR DETERMINING THE SENSITIVITY OF REED SWITCHES

BACKGROUND OF THE INVENTION

1. Field of the Invention

The present invention relates most generally to the field of electromagnetic test apparatus and more particularly to a new and improved apparatus for determining the sensitivity characteristics of reed switches.

2. Description of the Prior Art

The reed switch typically includes two flexible ferromagnetic reed blades in a parallel partially overlapping arrangement, one sealed in each end of a piece of glass tubing. When such a sealed reed contact arrangement is subjected to a magnetic field a flux path is established axially along one reed blade, across the air gap between the two reed blades and axially along the second. The overlapping ends of the two reed blades are thus oppositely polarized and attracted to one another. A sufficiently high magnetic field will thus bring the reed blades into contact with one another, operating the reed switch. In practice, any given reed switch will be designed such as to operate and release at preselected magnetic flux densities by proper selection of reed blade materials and size of the gap between the overlapping portions of the reed blades.

Reed switches have come into very widespread use and in many electronic systems, such as a telephone switching system, many tens of thousands of reed switches may be used. It is, however, necessary that these reed switches reliably operate and release at their intended flux densities and thus require testing as to their sensitivity prior to use in a system. Since this type of switch is used in such large quantities an efficient sensitivity test apparatus is highly desirable.

Prior to the present invention the sensitivity of reed switches has been tested by mechanically grasping the switch capsule, electrically contacting the switch terminals, and subjecting the switch to a variable magnetic field. Operation and release of the switch was then sensed by a continuity checking arrangement. One such apparatus of the manually operated type is disclosed in U.S. Pat. No. 3,609,524 which issued to Edward J. Kazmer on Sept. 28, 1971. In that apparatus the reed switch is passed by a series of rod-shaped permanent magnets having increasingly higher flux densities and switch contact closure is sensed through nonmagnetic, electrically conducting bars which contact the switch terminals. Another reed switch test apparatus of the automatic type is described in U.S. Pat. No. 2,924,333 which issued to F. Kulick et al. on Feb. 9, 1960. With that apparatus the reed switches are moved to sequential test stations where the switch terminals are grasped by pneumatically actuated contactors during each test.

Although these two prior art approaches to reed switch testing may be adequate in certain applications the manually operated apparatus is clearly inappropriate for testing mass produced switches and the automatic apparatus is rendered highly complex, in part due to the requirement that electrical contact be made with the terminals of each switch.

OBJECTS AND SUMMARY OF THE INVENTION

From the preceding discussion it will be understood that among the various objectives of the present invention are included the following:

the provision of a new and improved apparatus for determining the sensitivity characteristics of reed switches;

the provision of apparatus of the above-described character which does not require in its operation any electrical contact with the terminals of the switch being tested; and the provision of apparatus of the above-described character which is of simplified construction and improved efficiency.

These and other objectives of the present invention are efficiently achieved by providing an inclined linear array of test and soaking coils, each having a preselected flux density. Each test coil is coupled to a source of d.c. power and to a circuit for detecting reed blade motion as the switch passes axially through each test coil. Reed blade motion or the absence thereof is manifested as an output pulse or lack thereof. A pulse counter is used to count the pulses to thereby indicate that the sensitivity of the reed switch under test is either high, low or nominal. The pulse counter output may thus be used to actuate apparatus for sorting the reed switches into selected sensitivity categories.

The foregoing as well as other objects, features and advantages of the present invention will become more apparent from the following detailed description taken in conjunction with the various views of the appended drawings.

DESCRIPTION OF THE PREFERRED EMBODIMENT

Figure 1:
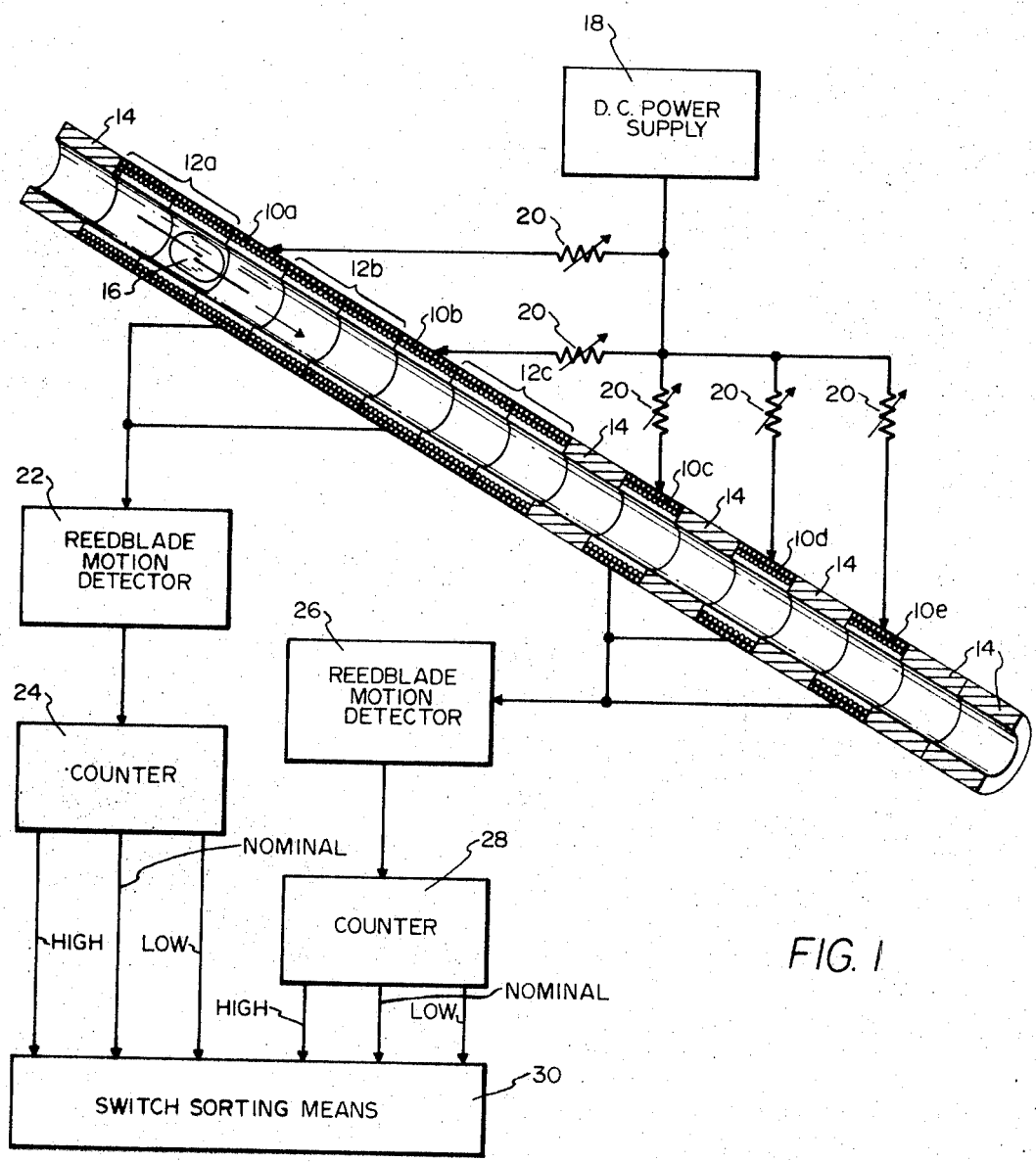
FIG. 1 is a schematic illustration, partially in cross section, of one embodiment of the present invention.

Turning now to FIG. 1 there is schematically illustrated a reed switch sensitivity testing apparatus constructed in accordance with the principles of the present invention. A linear array of switch testing coils 10a–e, soaking coils 12a–c and non-ferrous spacers 14 is provided. The array is preferably oriented at some angle of inclination such that a reed switch 16 inserted at the upper end will slide axially under the influence of gravity. It will be apparent that a particular orientation will be less significant if the reed switch were driven pneumatically through the array. It is also preferred that coils and spacers be arranged such as to form a channel just large enough to allow the reed switch to move freely and that each coil and spacer have a longitudinal dimension approximately equal to the length of the reed switch to be tested.

A d.c. power supply 18 is coupled to each test coil 10 such as to generate a magnetic field of a selected flux density in each. The flux density in each individual coil may be established either by selecting the desired number of turns for each or the current through each may be adjusted by means of a potentiometer 20 coupled between each coil 10 and the power supply 18.

Test coils 10a and 10b are used to categorize the reed switch 16 release sensitivity and have outputs coupled to a first reed blade motion detector circuit 22 which provides a pulsed output signal when the reed switch releases while passing through the coils. The output of the detector circuit 22 is coupled to a binary counter 24, the detailed construction of which is well known in the art. As will be explained hereinafter the release sensitivity of the reed switch 16 is categorized as high, nominal, or low depending upon the pattern of pulses from the reed blade motion detector circuit 22. The outputs of the binary counter 24 may be coupled to any suitable switch sorting means 30. In a similar fashion, test coils 10c, 10d and 10e are used to determine the reed switch 16 operate sensitivity and therefore have outputs coupled to a second reedblade motion detector circuit 26. The output of the motion detector 26 is coupled to a second binary counter 28 which has its outputs coupled to the switch sorting means 30. The switch sorting means may, for example, be a simple solenoid operated deflection arrangement placed at the exit from the testing array to sort the tested switches into appropriate collection bins.

The soaking coils 12a–c in the testing array serve to magnetically soak each switch before a given test is performed and are thus coupled to a suitable power supply (not shown). These coils are preferably arranged in pairs if the coil length is approximately equal to the length of the switch being tested, and may or may not all have the same flux density depending upon the nature of the switch being tested. The spacers 14 are preferably aluminum cylinders which allow each switch to release prior to its next test.

Figure 2:
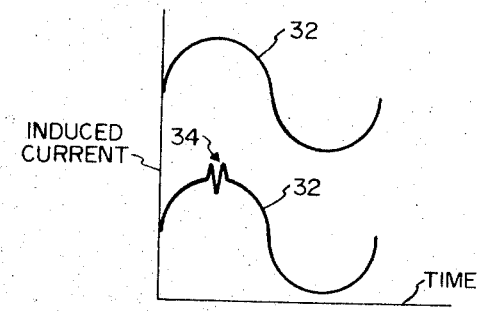
FIG. 2 is a graph comparing the test coil output in the presence and absence of reed blade operation as a reed switch passes through one coil of the apparatus of FIG. 1.

The principle underlying the operation of the apparatus of FIG. 1 is graphically illustrated in FIG. 2. The blades of the reed switch 16 must, of course, be made of a ferrous material and, in passing axially through any given coil, will induce a current therein. It has been found by the applicants that as a reed switch passes through a given coil with the blades at rest an essentially sinusoidal low frequency current waveform 32 will be induced. If, however, the blades of the switch are also in motion as the switch passes through the coil, a relatively high frequency component 34 will be superimposed on the basic sinusoidal waveform 32. This higher frequency portion will be present when the blades either open or close during the time the switch is passing through the coil.

Figure 3:
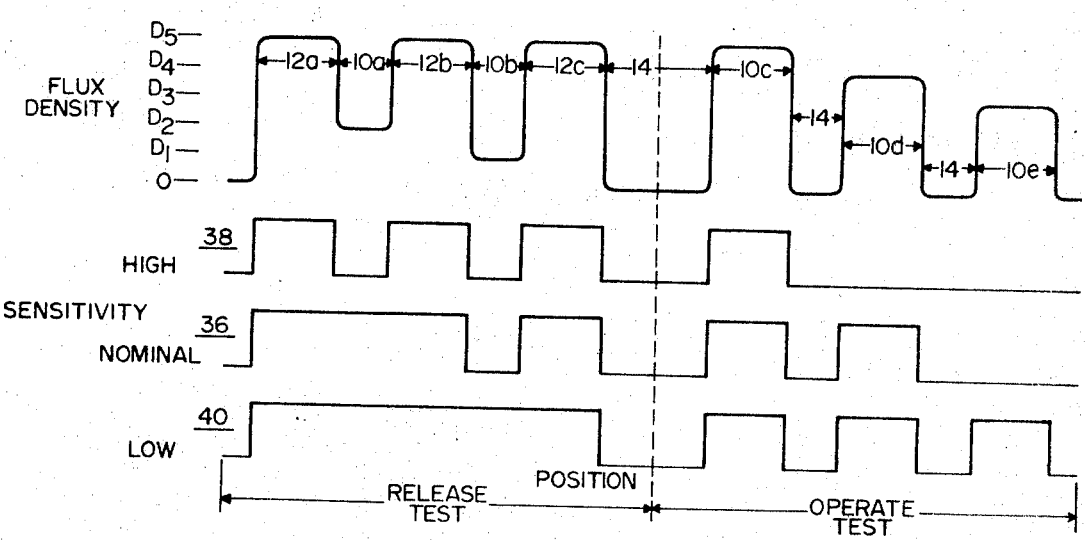
FIG. 3 is a graph comparing the reed blade motion detector output signals for reed switches having high, nominal and low operating and release sensitivity.

With reference to FIGS. 1 and 3 it will be seen that soaking coil 12a will provide a flux sensity, $D_5$, which is higher than that necessary to operate the switch 16 being tested. The first test coil 10a will provide a flux density of a level $D_2$, at which the switch 16 should not release; i.e., above the nominal switch release range, and the second test coil 10b will provide a flux density of a level $D_1$, corresponding to the low end of the nominal switch release range at which the switch 16 should release. By way of example, the soaking coils 12a and 12b may be 60 ampere-turns each, test coil 10a may be 25 ampere-turns and test coil 10b may be 15 ampere-turns. Thus if a reed switch designed to release in the 15–25 ampere-turn range is passed through the coils 12a, 10a, 12b and 10b it should release as it passes through test coil 10b but not as it passes through coil 10a. A switch having a proper release sensitivity thus should produce a single output pulse, (trace 36) at the reedblade motion detector circuit 22 output during the release test. Correspondingly a switch with a too high release sensitivity will produce two pulses (trace 38) and too low a release sensitivity will produce no output pulses (trace 40).

Test coils 10c, 10d and 10e form the switch operate sensitivity testing portion of the apparatus of FIG. 1. From FIG. 3 it will be seen that coil 10c provides a flux density, $D_5$, which is higher than that normally required to operate the switch 16, coil 10d provides a flux density, $D_4$, within the nominal operating range of the switch, and coil 10e provides a flux density, $D_3$, which is lower than that which should be necessary to operate the switch 16. Again, the non-ferrous spacers 14 have no field and permit the switch 16 to release prior to passing through each of the coils 10c–10e. As an example, if the reed switch 16 is intended to operate in the 35–55 ampere-turn range coil 10c may be 60 ampere-turns, coil 10d, 50 ampere-turns, and coil 10e, 30 ampere-turns. A reed switch having an operate sensitivity within the nominal range will thus produce two output pulses (trace 36) at the reedblade motion detector 26, a switch having a high operating sensitivity (i.e., too high a flux density is necessary to operate the switch) will produce only a single pulse (trace 38) and too low an operating sensitivity will produce three output pulses (trace 40).

As stated above, the output pulses during the release test and operate test are counted and used to categorize and sort the tested switches as to their release and operate sensitivities.

Figure 4:
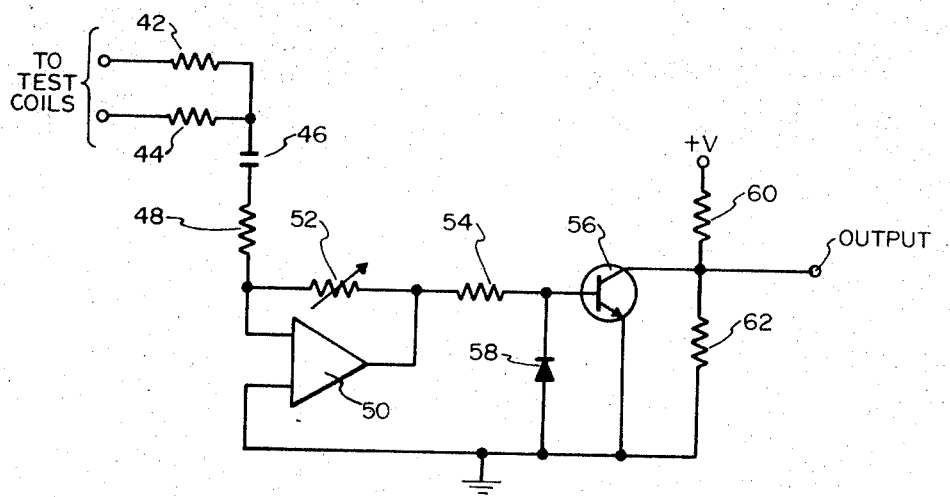
FIG. 4 is a schematic circuit diagram of a reed blade motion detector of utility in the apparatus of FIG. 1.

FIG. 4 is a schematic illustration of a reedblade motion detector circuit which has been found by the applicants to be of utility in the practice of their invention. The test coils are each coupled via an input resistor 42, 44 to capacitor 46 which serves to block the direct current present in each coil and together with resistor 48 forms a high pass filter which blocks the low frequency sinusoidal current induced by a reed switch passing through a coil with its reedblades at rest. Only the higher frequency current induced by reedblade motion is thus applied to one input of amplifier 50, the gain of which may be adjusted via potentiometer 52. The output of amplifier 50 is coupled through resistor 54 to the base of npn transistor 56 and the cathode of diode 58. The emitter of transistor 56 and the anode of diode 58 are coupled in parallel to the other input of amplifier 50 and to ground potential. Resistors 60 and 62 form a voltage divider which may be used if the operating potential, +V, of the circuit is higher than that which could be handled by the binary counter circuitry. The collector of transistor 56 is thus the detector circuit output lead and will provide an output pulse each time the reedblades of a switch are in motion as the switch traverses a coil. Both of the reedblade motion detectors 22 and 26 of FIG. 1 may be of the type shown in FIG. 3.

From the foregoing description it will be seen that the applicants have provided a new and improved reed switch sensitivity testing apparatus whereby the objectives set forth hereinabove are efficiently met. The potential for gravity feeding of switches through the test apparatus and complete elimination of any requirement for electrically contacting the switch terminals represents a substantial improvement over the alternative testing apparatus of the prior art. Since certain changes and modifications will occur to those skilled in the art without departure from the scope of the invention it is intended that all matter contained in the preceding description or shown in the appended drawings shall be interpreted as illustrative and not in any limiting sense.

Having described what is new and novel and desired to secure by Letters Patent, what is claimed is:

1. Apparatus for testing the sensitivity of reed switches comprising
   a source of direct current;
   a plurality of test coils disposed in a linear array each coupled to said direct current source, and each having a preselected flux density related to a preselected nominal flux density at which said switch is intended to operate and release such that said switch operates when passed through a coil having a flux density in excess of said nominal level, and releases when passed through a coil having a flux density less than said nominal level, operation and release of said switch inducing an alternating current in said coils;
   means coupled to each said test coil for detecting said alternating current induced therein;
   means coupled to said detecting means for counting the number of times said reed switch operates and releases in passing through said linear array of test coils and producing an output signal representing the flux density levels at which said switch operates and releases with respect to said nominal flux density level.

2. Apparatus as recited in claim 1 wherein
   said linear array of test coils includes a switch release test portion comprising first and second release test coils and further including first and second soaking coils, one disposed immediately preceding each of said first and second release test coils in said linear array;
   each of said soaking coils having a flux density greater than said nominal flux density;
   said first release test coil having a flux density less than that of said soaking coils and greater than said nominal flux density; and
   said second release test coil having a flux density less than said nominal flux density;
   whereby a switch having a nominal release sensitivity will remain operated when passing through said first release test coil and will release when passing through said second release test coil.

3. Apparatus as recited in claim 2 further including a third soaking coil having a flux density greater than said nominal flux density disposed immediately following said second release test coil in said linear array.

4. Apparatus as recited in claim 2 wherein said detecting means comprises
   a high pass filter coupled in parallel to said first and second release test coils for passing substantially only said alternating current induced in said release test coils by release of said switch, and
   output means coupled to said filter to produce an electrical output pulse in response to said induced alternating current.

5. Apparatus as recited in claim 2 wherein
   said means for counting the number of times said switch releases is a three output binary counter having a first output for indicating that the release sensitivity of said switch is higher than nominal when two electrical output pulses are counted, a second output for indicating that the release sensitivity of said switch is substantially nominal when one electrical output pulse is counted, and a third output for indicating the release sensitivity of said switch is lower than nominal when no electrical output pulses are counted.

6. Apparatus as recited in claim 4 wherein said output means includes
   a source of operating potential, and
   an npn transistor having a base coupled to said high pass filter, an emitter coupled to ground potential, and a collector coupled to said source of operating potential such that an electrical output pulse is produced at said collector when said alternating current is passed by said filter.

7. Apparatus as recited in claim 6 wherein said output means further includes
   a variable gain amplifier having a first input coupled to said high pass filter, an output coupled to the base of said transistor and a second input coupled to the emitter of said transistor.

8. Apparatus as recited in claim 1 wherein
   said linear array of test coils includes a switch operate test portion comprising first, second, and third operate test coils and further including non-ferrous spacers, one disposed immediately preceding each of said first, second and third operate test coils in said linear array;
   said first operate test coil having a flux density in excess of said nominal flux density;
   said second operate test coil having a flux density substantially equal to said nominal flux density; and
   said third operate test coil having a flux density less than said nominal flux density;
   whereby a switch having a nominal operate sensitivity will operate when passing through said first and second operate test coils and remain unoperated when passing through said third operate test coil.

9. Apparatus as recited in claim 8 wherein said detecting means comprises
   a high pass filter coupled in parallel to said first, second and third operate test coils for passing only said alternating current induced in said operate test coils by operation of said switch, and
   output means coupled to said filter to produce an electrical output pulse in response to said induced alternating current.

10. Apparatus as recited in claim 8 wherein
    said means for counting the number of times said switch operates is a three output binary counter having a first output for indicating that the operate sensitivity of said switch is higher than nominal when one electrical output pulse is counted, a second output for indicating that the operate sensitivity of said switch is substantially nominal when two electrical output pulses are counted, and a third output for indicating that the operate sensitivity of said switch is lower than nominal when three electrical output pulses are counted.

11. Apparatus as recited in claim 9 wherein said output means includes
    a source of operating potential, and an npn transistor having a base coupled to said high pass filter, an emitter coupled to ground potential, and a collector coupled to said source of operating potential such that an electrical output pulse is produced at said collector when said alternating current is passed by said filter.

12. Apparatus as recited in claim 11 wherein said output means further includes a variable gain amplifier having a first input coupled to said high pass filter, an output coupled to the base of said transistor and a second input coupled to the emitter of said transistor.

13. Apparatus as recited in claim 1 further including means disposed at the exit from said linear array and coupled to said counting means for sorting said switches into categories of high, nominal and low operate and release sensitivity.

* * * * *